United States Patent [19]

Iizuka et al.

[11] Patent Number: 5,845,044
[45] Date of Patent: Dec. 1, 1998

[54] RECORDING APPARATUS COMPRISING A CAMERA AND A CASSETTE WHICH INCLUDES A SEPARATE MEMORY FOR STORING CAMERA PARAMETERS

[75] Inventors: Ken Iizuka, Kanagawa; Masaki Oguro, Tokyo, both of Japan

[73] Assignee: Sony Corporation, Tokyo, Japan

[21] Appl. No.: 803,846

[22] Filed: Feb. 28, 1997

Related U.S. Application Data

[63] Continuation of Ser. No. 388,837, Feb. 15, 1995, abandoned.

[30] Foreign Application Priority Data

Feb. 15, 1994 [JP] Japan ................................ 6-040493

[51] Int. Cl.⁶ ........................ H04N 5/225; H04N 5/76; H04N 5/91; H04N 5/928
[52] U.S. Cl. ........................ 386/117; 386/95; 386/107; 396/81; 348/345; 348/232; 360/132; 360/137; 358/906
[58] Field of Search .................................. 348/207, 231, 348/232, 345; 360/27, 33.1, 132, 137; 386/120, 117, 95, 107; 358/906

[56] References Cited

U.S. PATENT DOCUMENTS

| | | | |
|---|---|---|---|
| 4,338,644 | 7/1982 | Staar | 360/132 |
| 4,383,285 | 5/1983 | Staar | 360/132 |
| 4,574,319 | 3/1986 | Konishi | 358/335 |
| 4,893,202 | 1/1990 | Smith . | |
| 4,935,763 | 6/1990 | Itoh et al. | 354/400 |
| 5,018,017 | 5/1991 | Sasaki et al. | 358/209 |
| 5,040,068 | 8/1991 | Parulski et al. | 358/209 |
| 5,142,310 | 8/1992 | Taniguchi et al. | 354/106 |
| 5,406,380 | 4/1995 | Teter | 358/332 |
| 5,436,660 | 7/1995 | Sakamoto | 348/207 |
| 5,455,409 | 10/1995 | Smith et al. | 235/385 |
| 5,493,455 | 2/1996 | Miyoshi et al. | 360/60 |
| 5,572,278 | 11/1996 | Hamada et al. | 396/49 |
| 5,697,004 | 12/1997 | Saegusa et al. | 396/211 |

FOREIGN PATENT DOCUMENTS 0 580 434 A  1/1994  European Pat. Off. .

OTHER PUBLICATIONS

Patent Abstracts of Japan, vol. 16, No. 558, (E–1294), Nov. 27, 1992 for JP 04213280 A (Sony Corp.), Aug. 4, 1992.

*Primary Examiner*—Douglas W. Olms
*Assistant Examiner*—David R Vincent
*Attorney, Agent, or Firm*—Frommer Lawrence & Haug, LLP; William S. Frommer; Dennis M. Smid

[57] ABSTRACT

Disclosed herein is an image recording apparatus for recording an image signal outputted from an image sensing device on a recording medium held in a cassette. The image recording apparatus comprises a reading device for reading information about control of the image sensing device from incident data stored in a memory device installed in the cassette, a supplying device for generating data for setting the image sensing device from the information read by the reading device and supplying the data to the image sensing device, a generating device for generating information about the control of the image sensing device based on data for setting the image sensing device and a writing device for writing the generated information into the memory device installed in the cassette. Since the generating device and the writing device are provided, the image recording apparatus can provide satisfactory ease of operation. Further, since camera setting data can be stored for each cassette, an image-sensing condition at the time that the contents of each cassette have been recorded, can be immediately set to a camera.

8 Claims, 15 Drawing Sheets

FIG. 5

| Word Name | MSB | | | | | | LSB |
|---|---|---|---|---|---|---|---|
| PC 0 | (ITEM) | | | | | | |
| PC 1 | (DATA) | | | | | | |
| PC 2 | | | | | | | |
| PC 3 | | | | | | | |
| PC 4 | | | | | | | |

FIG. 6

| MSB UPPER | LSB LOWER | |
|---|---|---|
| 0 0 0 0 | x x x x | CONTROL |
| 0 0 0 1 | x x x x | TITLE |
| 0 0 1 0 | x x x x | CHAPTER |
| 0 0 1 1 | x x x x | PART |
| 0 1 0 0 | x x x x | PROGRAM |
| 0 1 0 1 | x x x x | AAUX |
| 0 1 1 0 | x x x x | VAUX |
| 0 1 1 1 | x x x x | CAMERA |
| 1 0 0 0 | x x x x | LINE |
| 1 0 0 1 | x x x x | RESERVED |
| 1 1 1 0 | x x x x | |
| 1 1 1 1 | a a a a | SOFT MODE |
| 1 1 1 1 | 1 1 1 1 | NO INFORMATION | a a a a : 0000 ~ 1110
x x x x : 0000 ~ 1111

FIG. 7A

CASSETTE ID

| | MSB | | | | | | | LSB |
|---|---|---|---|---|---|---|---|---|
| PC 0 | 0 | 0 | 0 | 0 | 0 | 0 | 0 | 0 |
| PC 1 | ME | 1 | 1 | MULTI-BYTES | | | MEM TYPE | |
| PC 2 | MEMORY SIZE OF SPACE 0 | | | | M. S. L. B. S. | | | |
| PC 3 | MEMORY BANK NO. of SPACE 1 | | | | | | | |
| PC 4 | THICK 1 | | | | THICK 1/10 | | | |

ME : MIC ERROR FLAG
M.S.L.B.S. : MEM. SIZE of the LAST BANK in SPACE 1

FIG. 7B

TAPE LENGTH

| | MSB | | | | | | | LSB |
|---|---|---|---|---|---|---|---|---|
| PC 0 | 0 | 0 | 0 | 0 | 0 | 0 | 0 | 1 |
| PC 1 | --------------------------------→ LSB | | | | | | | 1 |
| PC 2 | -------------------TAPE LENGTH------------------- | | | | | | | |
| PC 3 | MSB ←---------------( BINARY )--------------- | | | | | | | |
| PC 4 | 1 | 1 | 1 | 1 | 1 | 1 | 1 | 1 |

FIG. 7C

TITLE END

| | MSB | | | | | | | LSB |
|---|---|---|---|---|---|---|---|---|
| PC 0 | 0 | 0 | 0 | 1 | 1 | 1 | 1 | 1 |
| PC 1 | --------------------------------→ LSB | | | | | | | BF |
| PC 2 | -------------ABSOLUTE TRACK-- NO.------------- | | | | | | | |
| PC 3 | MSB ←---------------( BINARY )--------------- | | | | | | | |
| PC 4 | SL | RE | 1 | 1 | 1 | 1 | 1 | 1 |

FIG. 7D

PROGRAM START

| | MSB | | | | | | | LSB |
|---|---|---|---|---|---|---|---|---|
| PC 0 | 0 | 1 | 0 | 0 | 1 | 0 | 1 | 1 |
| PC 1 | --------------------------------→ LSB | | | | | | | TT |
| PC 2 | ------------ ABSOLUTE TRACK NO. ------------ | | | | | | | |
| PC 3 | MSB ←------------ ( BINARY ) ------------ | | | | | | | |
| PC 4 | TEXT | | GENRE CATEGORY | | | | | |

FIG. 7E

PROGRAM END

| | MSB | | | | | | | LSB |
|---|---|---|---|---|---|---|---|---|
| PC 0 | 0 | 1 | 0 | 0 | 1 | 1 | 1 | 1 |
| PC 1 | --------------------------------→ LSB | | | | | | | BF |
| PC 2 | ------------ ABSOLUTE TRACK NO. ------------ | | | | | | | |
| PC 3 | MSB ←------------ ( BINARY ) ------------ | | | | | | | |
| PC 4 | SL | RP | PD | TNT | | | 1 | 1 |

FIG. 8A

PROGRAM REC DATE TIME

| | MSB | | | | | | | LSB |
|---|---|---|---|---|---|---|---|---|
| PC 0 | 0 | 1 | 0 | 0 | 0 | 0 | 1 | 0 |
| PC 1 | RM | MINUTES ||||||||
| PC 2 | WEEK ||| HOURS |||||
| PC 3 | MSB ←······ ||| DAY |||||
| PC 4 | ······YEAR······→LSB |||| MONTH ||||

FIG. 8B

CONSUMER CAMERA1

| | MSB | | | | | | | LSB |
|---|---|---|---|---|---|---|---|---|
| PC 0 | 0 | 1 | 1 | 1 | 0 | 0 | 0 | 0 |
| PC 1 | 1 | 1 | IRIS POSITION ||||||
| PC 2 | AE MODE |||| AGC ||||
| PC 3 | WHITE BALANCE ||||||||
| PC 4 | FOCUS POSITION ||||||||

FIG. 8C

CONSUMER CAMERA2

| | MSB | | | | | | | LSB |
|---|---|---|---|---|---|---|---|---|
| PC 0 | 0 | 1 | 1 | 1 | 0 | 0 | 0 | 1 |
| PC 1 | 1 | 1 | V PANNING ||||||
| PC 2 | IS | H PANNING |||||||
| PC 3 | FOCAL LENGTH ||||||||
| PC 4 | ZEN | E-ZOOM |||||||

FIG. 8D

LENS

| | MSB | | | | | | | LSB |
|---|---|---|---|---|---|---|---|---|
| PC 0 | 0 | 1 | 1 | 1 | 0 | 0 | 1 | 1 |
| PC 1 | FOCUS POSITION ||||||||
| PC 2 | IRIS POSITION ||||||||
| PC 3 | ZOOM POSITION ||||||||
| PC 4 | 1 | 1 | EXTENDER |||| IRIS CONT ||

FIG. 8E

GAIN

| | MSB | | | | | | | LSB |
|---|---|---|---|---|---|---|---|---|
| PC 0 | 0 | 1 | 1 | 1 | 0 | 1 | 0 | 0 |
| PC 1 | MASTER GAIN ||||||||
| PC 2 | R GAIN ||||||||
| PC 3 | B GAIN ||||||||
| PC 4 | ND FILTER |||| CC FILTER ||||

FIG. 9A

| PEDESTAL | | | | | | | | | |
|---|---|---|---|---|---|---|---|---|---|
| | MSB | | | | | | | | LSB |
| PC 0 | 0 | 1 | 1 | 1 | 0 | 1 | 0 | 1 |
| PC 1 | G PEDESTAL |||||||||
| PC 2 | R PEDESTAL |||||||||
| PC 3 | B PEDESTAL |||||||||
| PC 4 | QF || 1 | BP ||  RP || GP ||

FIG. 9B

| GAMMA | | | | | | | | | |
|---|---|---|---|---|---|---|---|---|---|
| | MSB | | | | | | | | LSB |
| PC 0 | 0 | 1 | 1 | 1 | 0 | 1 | 1 | 0 |
| PC 1 | G GAMMA |||||||||
| PC 2 | R GAMMA |||||||||
| PC 3 | B GAMMA |||||||||
| PC 4 | QF || 1 | BG || RG || GG ||

FIG. 9C

| DETAIL | | | | | | | | | |
|---|---|---|---|---|---|---|---|---|---|
| | MSB | | | | | | | | LSB |
| PC 0 | 0 | 1 | 1 | 1 | 0 | 1 | 1 | 1 |
| PC 1 | MASTER DETAIL LEVEL |||||||||
| PC 2 | H DETAIL LEVEL |||||||||
| PC 3 | V DETAIL LEVEL |||||||||
| PC 4 | QF || 1 | VD || HD || DL ||

FIG. 9D

CAMERA TEXT HEADER

| | MSB | | | | | | | LSB |
|---|---|---|---|---|---|---|---|---|
| PC 0 | 0 | 1 | 1 | 1 | 1 | 0 | 0 | 0 |
| PC 1 | ←-------- TDP ( BINARY ) --------→ LSB |||||||||
| PC 2 | TEXT TYPE |||| OPN ||| MSB← |
| PC 3 | TEXT CODE ||||||||
| PC 4 | 1 | 1 | 1 | 1 | 1 | 1 | 1 | 1 |

FIG. 9E

CAMERA TEXT

| | MSB | | | | | | | LSB |
|---|---|---|---|---|---|---|---|---|
| PC 0 | 0 | 1 | 1 | 1 | 1 | 0 | 0 | 1 |
| PC 1 | | | | | | | | |
| PC 2 | | | | | | | | |
| PC 3 | | | | | | | | |
| PC 4 | | | | | | | | |

FIG. 10A

CAMERA PRESET

| | MSB | | | | | | | LSB |
|---|---|---|---|---|---|---|---|---|
| PC 0 | 0 | 1 | 1 | 1 | 1 | 0 | 1 | 1 |
| PC 1 | SHUTTER SPEED(1) ||||||||
| PC 2 | SHUTTER SPEED(2) ||||||||
| PC 3 | -------- CONSUMER SHUTTER SPEED --------→LSB ||||||||
| PC 4 | TEXT | MSB◄-------------------------- |||||||

FIG. 10B

FLARE

| | MSB | | | | | | | LSB |
|---|---|---|---|---|---|---|---|---|
| PC 0 | 0 | 1 | 1 | 1 | 1 | 1 | 0 | 0 |
| PC 1 | G FLARE ||||||||
| PC 2 | R FLARE ||||||||
| PC 3 | B FLARE ||||||||
| PC 4 | QF | 1 | BF ||| RF || GF |

FIG. 10C

SHADING-1

| | MSB | | | | | | | LSB |
|---|---|---|---|---|---|---|---|---|
| PC 0 | 0 | 1 | 1 | 1 | 1 | 1 | 0 | 1 |
| PC 1 | 1 | SHAD COMPO(1) |||||||
| PC 2 | QF0 | SHAD COMPO(3) |||||||
| PC 3 | QF1 | SHAD COMPO(4) |||||||
| PC 4 | QF2 | SHAD COMPO(6) |||||||

FIG. 10D

SHADING-2

| | MSB | | | | | | | LSB |
|---|---|---|---|---|---|---|---|---|
| PC 0 | 0 | 1 | 1 | 1 | 1 | 1 | 0 | 1 |
| PC 1 | 1 | SHAD COMPO(0) |||||||
| PC 2 | QF0 | SHAD COMPO(2) |||||||
| PC 3 | QF1 | SHAD COMPO(5) |||||||
| PC 4 | QF2 | SHAD COMPO(7) |||||||

| 0 | 1 | 2 |
|---|---|---|
| 3 | Center | 4 |
| 5 | 6 | 7 |

KNEE

| | MSB | | | | | | | LSB |
|---|---|---|---|---|---|---|---|---|
| PC 0 | 0 | 1 | 1 | 1 | 1 | 1 | 1 | 0 |
| PC 1 | KNEE POINT ||||||||
| PC 2 | KNEE SLOPE ||||||||
| PC 3 | 1 | 1 | 1 | 1 | 1 | 1 | 1 | 1 |
| PC 4 | 1 | 1 | 1 | 1 | 1 | 1 | 1 | 1 |

SHUTTER

| | MSB | | | | | | | LSB |
|---|---|---|---|---|---|---|---|---|
| PC 0 | 0 | 1 | 1 | 1 | 1 | 1 | 1 | 1 |
| PC 1 | SHUTTER SPEED(1) ||||||||
| PC 2 | SHUTTER SPEED(2) ||||||||
| PC 3 | ------ CONSUMER SHUTTER SPEED ------→ LSB ||||||||
| PC 4 | 1 | MSB ←------------------------------- |||||||

…

RECORDING APPARATUS COMPRISING A CAMERA AND A CASSETTE WHICH INCLUDES A SEPARATE MEMORY FOR STORING CAMERA PARAMETERS

This application is a continuation of application Ser. No. 08/388,837, filed on Feb. 15, 1995, now abandoned.

BACKGROUND OF THE INVENTION

1. Field of the Invention

The present invention relates to an image recording apparatus for recording an image signal outputted from an image sensing device.

2. Description of the Related Art

A portable and compact image sensing and recording system has been currently widely employed regardless of commercial or public use which is a combination of an imaging or image sensing device and an image recording apparatus for recording an image signal obtained from the image sensing device on a recording medium having a cassette structure.

As such an image sensing and recording system, systems called, for example, a television (TV) camera incorporated video cassette recorder (VCR) for commercial or public use and a so-called electronic still video camera for public use are known.

Owing to a weight reduction in this type of image sensing and recording system, it is convenient to handle the image sensing and recording system. Further, the image sensing and recording system can be used under various indoor and outdoor conditions and can provide high mobility.

The following six applications filed by the same applicant are known as related arts to the present application:
1. European Patent Laid-Open Number: 0599718 (Laid-Open Date: Jun. 1, 1994)
2. European Patent Laid-Open Number: 0614185 (Laid-Open Date: Sep. 7, 1994)
3. European Patent Application Number: 94303699.6 (Application Date: May 24, 1994)
4. Japanese Patent Application Number: 05277302 (Application Date: Oct. 12, 1993)
5. Japanese Patent Application Number: 05313788 (Application Date: Dec. 14, 1993)
6. U.S. Pat. No. : 5,093,716

The above 1, 2, 3 and 4 are pending in the corresponding U.S.A and Japan and the above 5 is pending in the corresponding U.S.A and Europe.

When the image sensing and recording system is used under the various conditions referred to above, imaging or image sensing environments are correspondingly changed in various ways. It is however of important to effect suitable adjustments corresponding to the respective image sensing environments on the image sensing device in particular in order to ensure satisfactory image quality.

However, a large number of adjustment items exist upon adjusting image-sensing characteristics or the like of the image sensing device. It therefore requires a great deal of labor to set the image sensing device to the optimum adjusted state.

Thus, when it is desired to image a different subject to be image-sensed under a different image-sensing condition in course of a repeated image-sensing process and thereafter image the original subject again where, for example, a particular subject is repeatedly image-sensed outdoors for a long period, the image sensing device must be re-adjusted. Since, however, many adjustment items exist, it is so difficult to adjust the image sensing device to the same state again. It therefore requires a great deal of labor to accurately perform such a re-adjustment.

SUMMARY OF THE INVENTION

With the foregoing in view, it is an object of the present invention to provide an image recording apparatus for recording an image signal outputted from an image sensing device on a recording medium accommodated in a cassette, comprising reading means for reading information about control of the image sensing device from incident data stored in a memory device installed in the cassette, and supplying means for generating data for setting the image sensing device from the information read by the reading means and supplying the data to the image sensing device.

Now, the incident data is constructed with an event comprised of a header pack and a pack subsequent to the header pack as a unit. Further, the reading means preferably identifies an event with the information recorded therein, based on data of the header pack in the event. It is desirable in terms of data processing that each of the header pack and the pack subsequent to the header pack has a data structure having a fixed length.

If the image recording apparatus further includes generating means for generating information about control of the image sensing device based on data for setting the image sensing device and writing means for writing the generated information into the memory device installed in the cassette, then ease of operation becomes satisfactory.

Since camera setting data can be stored for each cassette, an image-sensing condition at the time that the contents of each cassette have been recorded can be immediately set to a camera.

The above and other objects, features and advantages of the present invention will become apparent from the following description and the appended claims, taken in conjunction with the accompanying drawings in which a preferred embodiment of the present invention is shown by way of illustrative example.

BRIEF DESCRIPTION OF THE DRAWINGS

FIG. 5 is a view for explaining a basic structure of a pack;

FIG. 6 is a view showing the manner in which packs are divided into groups in accordance with large items;

FIGS. 7A, 7B, 7C, 7D and 7E are respectively views depicting structures of a CASSETTE ID pack, a TAPE LENGTH pack, a TITLE END pack, a PROGRAM START pack and a PROGRAM END pack;

FIGS. 8A, 8B, 8C, 8D and 8E are respectively views illustrating structures of a PROGRAM REC DATE TIME pack, a CONSUMER CAMERA-1 pack, a CONSUMER CAMERA-2 pack, a LENS pack and a GAIN pack;

FIGS. 9A, 9B, 9C, 9D and 9E are respectively views showing structures of a PEDESTAL pack, a GAMMA pack, a DETAIL pack, a CAMERA TEXT HEADER pack and a CAMERA TEXT pack;

FIGS. 10A, 10B, 10C and 10D are respectively views depicting structures of a CAMERA PRESET pack, a FLARE pack, a SHADING-1 pack and a SHADING-2 pack;

DETAILED DESCRIPTION OF THE PREFERRED EMBODIMENTS

A preferred embodiment in which the present invention is applied to a TV camera incorporated VCR, will hereinafter be described in detail with reference to the accompanying drawings.

Figure 3:
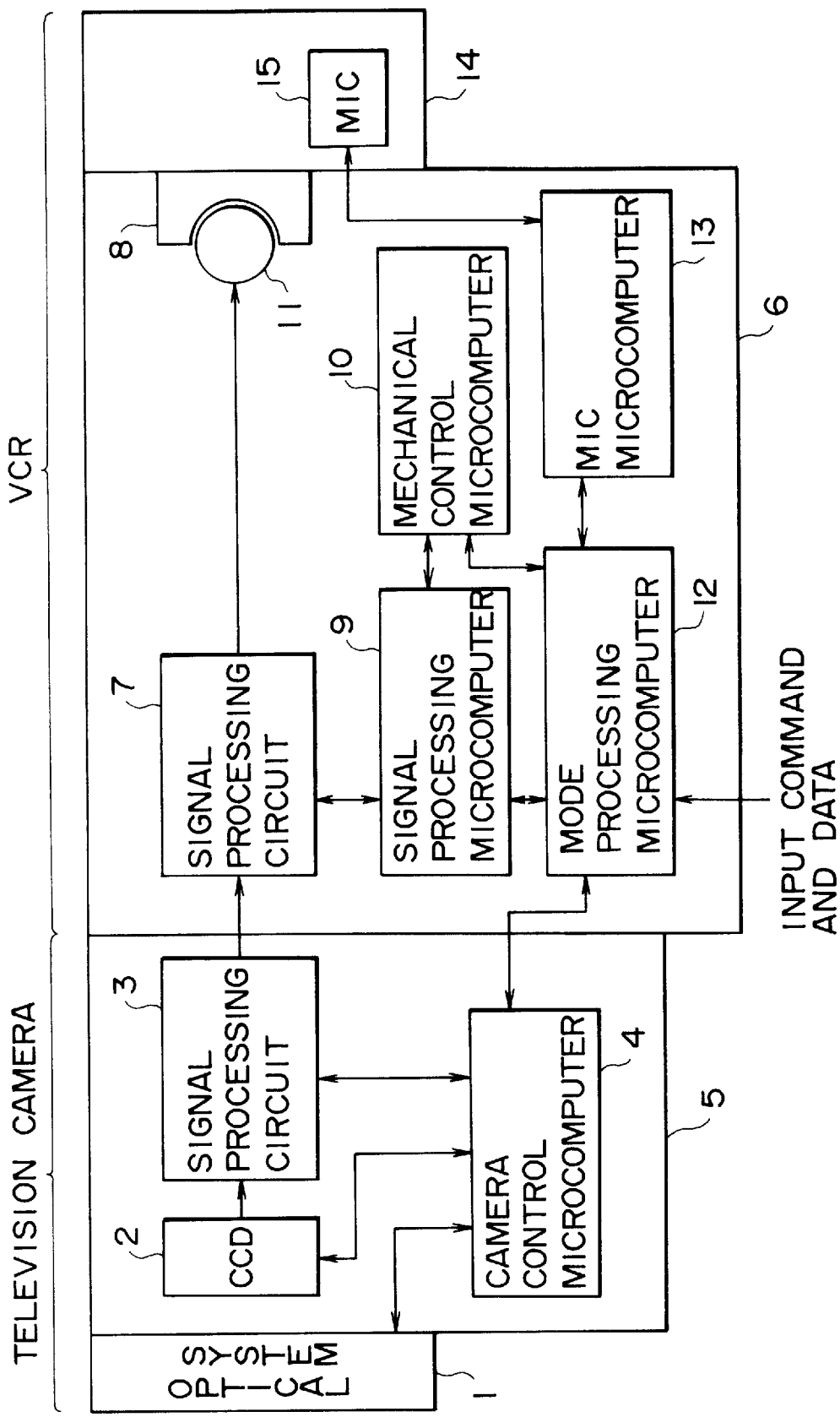
FIG. 3 is a view showing the structure of a TV camera incorporated VCR to which the present invention is applied.

FIG. 3 shows the overall structure of a TV camera incorporated VCR. In the same drawing, a TV camera unit comprises an optical system 1 and an imaging or image sensing device 5. A VCR unit comprises a recording and reproducing apparatus 6 and a tape cassette 14. A brief description will be made of a signal process of the TV camera incorporated VCR.

An image-sensed output generated from a CCD 2, which forms an image pickup or sensing element, is supplied to a signal processing circuit 3 where the output is subjected to various processes such as insertion of a synchronizing signal, etc. and converted into a signal set to a predetermined format. Thereafter, the so-processed signal is supplied to a signal processing circuit 7 of the recording and reproducing apparatus 6. The signal processing circuit 7 effects various processes necessary to record the signal on a tape 8 on the inputted signal. Thereafter, the so-processed signal is supplied to a recording head mounted on a rotating drum 11, which, in turn, helically records the supplied signal on the tape 8 withdrawn from the tape cassette 14.

Now, a mode processing microcomputer 12 provided within the recording and reproducing apparatus 6 is of a microcomputer which acts as a man-to-machine interface between the TV camera incorporated VCR and a user. Further, the mode processing microcomputer 12 receives therein various set inputs related to various adjustments and settings for the TV camera from the user, various operation commands from the user, for allowing the TV camera to perform various operations and various commands for allowing the recording and reproducing apparatus 6 to carry out various recording and reproducing operations.

The mode processing microcomputer 12 performs the transfer of commands and data between a camera control microcomputer 4 in the image sensing device 5 and the signal processing microcomputer 9, a mechanical control microcomputer 10 and an MIC microcomputer 13 in the recording and reproducing apparatus 6 in response to the various received commands to thereby carry out the entire control of the TV camera incorporated VCR.

Figure 4:
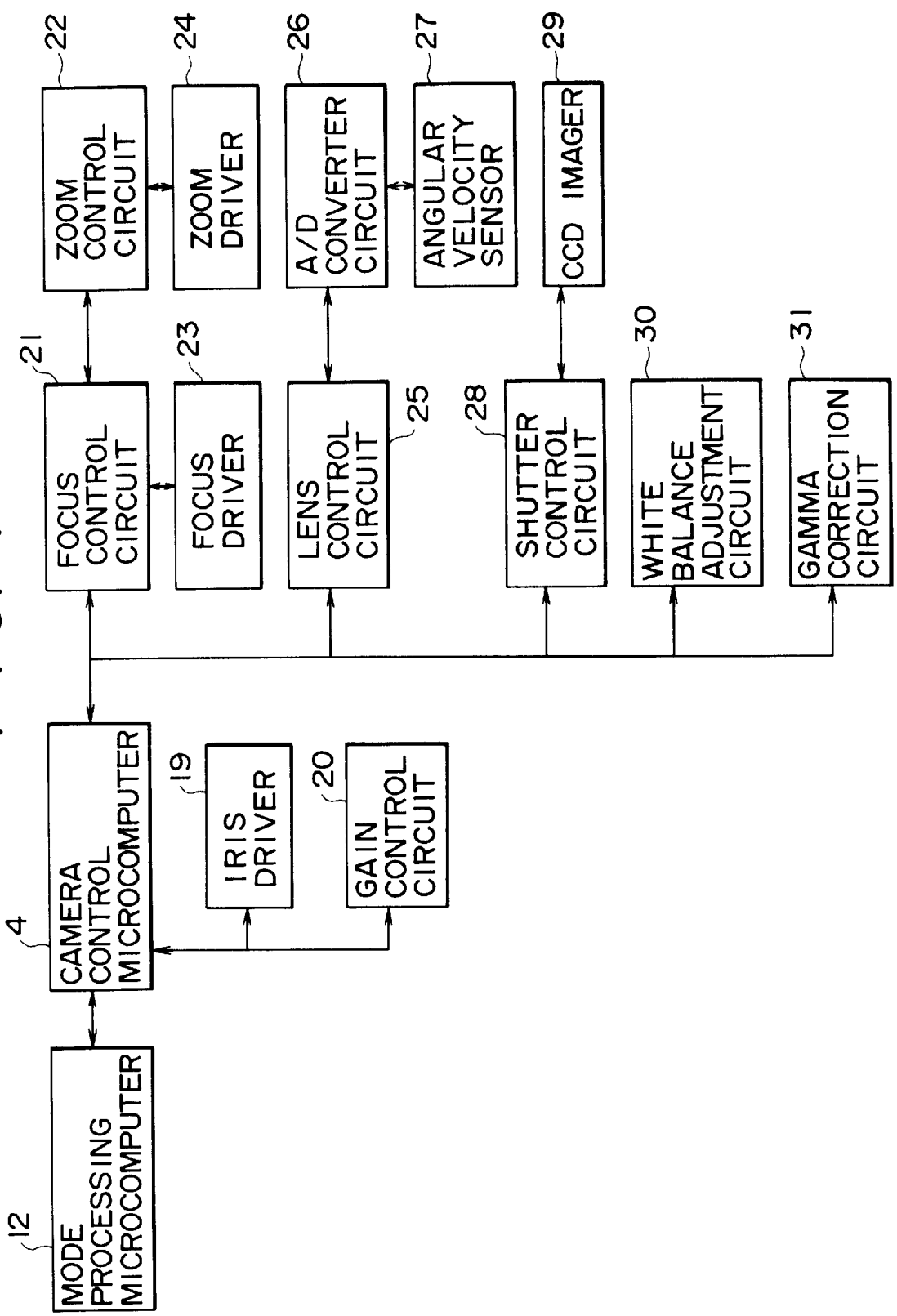
FIG. 4 is a view for describing settings and adjustments of a TV camera by a camera control microcomputer.

The camera control microcomputer 4 controls the optical system 1, the CCD 2 and the signal processing circuit 3 based on various commands and data inputted from the mode processing microcomputer 12. FIG. 4 is a block diagram showing the contents of control executed by the camera control microcomputer 4.

As shown in FIG. 4, controls/adjustments such as an iris control, a gain control, a focus control, a zoom control, a shutter control, a white-balance control, a gamma correction, etc. are widely executed. Further, a lens control circuit 25, an A/D converter circuit 26 and an angular velocity sensor 27 shown in FIG. 4 are provided to correct unintentional movements of the hands. Since they are not directly concerned with the subject matter of the present application, their description will be omitted.

The control of the recording and reproducing apparatus 6 shown in FIG. 3 is carried out based on the various commands and data inputted to the mode processing microcomputer 12 while the mode processing microcomputer 12, the signal processing microcomputer 9, the mechanical control microcomputer 10 and the MIC microcomputer 13 are being mutually-connected to one another.

On the other hand, an IC memory 15 in which incident data can be written, is installed in the tape cassette 14. When the tape cassette 14 is loaded into the recording and reproducing apparatus 6, the IC memory 15 is constructed so as to be electrically connected to the MIC microcomputer 13 in the recording and reproducing apparatus 6 via an MIC contact point (not shown).

In the VCR employed in the present embodiment, an AUX region for recording incident data therein is provided on the tape on which an image signal and an audio signal are recorded, although its detailed description is omitted. The mode processing microcomputer 12 can write various incident data into the tape or the IC memory 15 through either the signal processing microcomputer 9 or the MIC microcomputer 13 or read it therefrom therethrough as needed. The mode processing microcomputer 12 is constructed so as to allow the recording and reproducing apparatus 6 to perform a variety of operations using the incident data.

In addition to the above construction, the mode processing microcomputer 12 is constructed such that various pieces of information for setting and adjusting the TV camera are stored in the IC memory 15 and when the tape cassette 14 is loaded into the VCR, the stored information is read from the IC memory 15, thereby enabling the TV camera to be set and adjusted based on the read information at once. Incidentally, the IC memory is called "MIC (Memory In Cassette)" in the present application.

The aforementioned AUX region on the tape, the configuration of the incident data recorded in the MIC and a data structure of the MIC will now be described below.

1) Configuration of incident data:

As a rule, the incident data is configured with a pack having a fixed length of 5 bytes as a unit. Now, the structure and type of the pack will hereinafter be described in detail.

The pack has a basic structure of 5 bytes shown in FIG. 5. An initial byte (PC0) of the 5 bytes is defined as an "ITEM data" (also called "Pack Header") indicative of the contents of data. Formats of subsequent 4 bytes (PC1 through PC4) are determined so as to correspond to the ITEM data and arbitrary data is stored in accordance with the formats.

The ITEM data is divided into the four leftmost or upper-order bits and the four rightmost or lower-order bits, which are respectively called "large ITEMs" and "small ITEMS".

The large ITEMs serving as the four leftmost bits are represented as data indicative of application of the subsequent data, for example. The pack is developed into the following ten kinds of groups in accordance with the large ITEMs as represented in Table of FIG. 6:

| | |
|---|---|
| CONTROL | "0000", |
| TITLE | "0001", |
| CHAPTER | "0010", |
| PART | "0011", |
| PROGRAM | "0100", |
| AUDIO AUXILIARY DATA (AAUX) | "0101", |
| IMAGE AUXILIARY DATA (VAUX) | "0110", |
| CAMERA | "0111", |
| LINE | "1000", |
| SOFT MODE | "1111" |

Thus, the respective groups of the pack developed in accordance with the large ITEMs are developed into 16 kinds of packs by the small ITEMs (which represent the specific contents of subsequent data, for example). After all, 256 kinds of packs can be defined at the maximum using these ITEMs.

The term "RESERVED" entered in Table shown in FIG. 6 shows non-defined portions which were left for addition. Thus, new data can be recorded as needed in the future by defining new ITEM data (header) using codes for non-defined ITEM data. Since the contents of data stored in a corresponding pack can be seized by reading a header, the position where the pack is recorded on the tape or the MIC can be set as needed.

Specific examples of packs will now be described with reference to FIGS. 7 through 12.

A CASSETTE ID pack shown in FIG. 7A and a TAPE LENGTH pack shown in FIG. 7B belong to the group of CONTROL shown in FIG. 6 as is understood from values of their ITEM data.

Further, information about a flag ME indicative of whether or not data recorded in an MIC corresponds to data recorded on a tape of a cassette, the type of a memory (MIC) and the size of the memory and information (PC4) about the thickness of the tape are recorded in the CASSETTE ID pack.

The overall length of a body of a magnetic tape excluding a reader tape in a video tape is recorded in the TAPE LENGTH pack as 23-bit data obtained by converting its overall length to the number of tracks.

In the VCR employed in the present embodiment, absolute track numbers are recorded on respective recording tracks on the tape in order from the head of the tape. However, an absolute track number at the final image-recording position on the tape is recorded in a TITLE END pack shown in FIG. 7C in connection with the absolute track numbers referred to above.

The final recording position shows a position where any of regions or areas on the tape, which has been subjected to a recording process is nearest to the tape end. The areas subsequent to this position remains as non-recorded areas. Thus, the length (residual amount) of the non-recorded portion on the tape can be immediately determined from the values of the absolute track numbers stored in the TITLE END pack and the absolute track numbers stored in the TAPE LENGTH pack.

When a non-recorded portion (blank) exists in the course of the tape, discontinuous portions occur in the absolute track numbers recorded in their corresponding tracks on the tape. However, a flag BF in the TITLE END pack indicates whether such discontinuous portions are developed at positions prior to the positions of the absolute track numbers recorded in the pack.

Further, a flag SL indicates whether a recording mode at the final recording position corresponds to either one of SP and LP modes. When a recording operation is resumed from the final recording position, a servo system can be quickly started up using the flag SL. A flag RE indicates whether the contents of records, which are not allowed to be erased from the tape, exist on the tape.

Each of packs shown in FIGS. 7D and 7E and FIG. 8A belongs to the group of PROGRAM shown in FIG. 6 as is understood from its ITEM. Start and end positions of respective programs, which have been recorded on a tape, are respectively recorded in a PROGRAM START pack shown in FIG. 7D and a PROGRAM END pack shown in FIG. 7E. Namely, program start points and program end points are respectively stored in second through fourth bytes (PC1 through PC3) of these packs in accordance with absolute track numbers represented in the form of 23 bits.

A flag TEXT in a PC4 of the PROGRAM START pack indicates whether text information about a program for the flag TEXT has been recorded on an MIC (0: presence of TEXT information and 1: absence of TEXT information). However, when the above pack is recorded on the tape, the TEXT flag takes or selects a value "1" at all times. Further, a TT flag indicates whether tape recording start position data recorded on the MIC corresponds to tape recording start position data which has been actually recorded on the tape. The term "GENRE CATEGORY" is a code indicative of a genre (such as "baseball", a "movie", a "journey", a "drama" or the like) of the contents of a record.

Further, a RP flag stored in the PROGRAM END pack indicates whether the contents of a record has been erased. A PD flag indicates whether a program for the PD flag has first been reproduced immediately after the program has been recorded by a timer recording or the like. A TNT code indicates the number of text events (which will be described later) recorded in an MIC with respect to the program.

Incidentally, various flags such as an SL flag, a RP flag, a TEXT flag, etc. or codes called as the same class may often appear in other pack structures to be described later. However, any of them are the same meaning as described above.

The date, time, day of week and the like of recording of a corresponding program recorded on a tape are recorded in the PROGRAM REC DATA TIME pack shown in FIG. 8A. The term "RM" in the pack is a code for indicating whether a recording mode corresponds to any of a video, an audio and the like.

Each of packs shown in FIGS. 8B through 8E, FIGS. 9A through 9E, FIGS. 10A through 10D and FIG. 12A and 12B belongs to the group of CAMERA shown in FIG. 6 and is used for recording incident data related to a camera.

Namely, the following data are recorded in a CONSUMER CAMERA-1 pack shown in FIG. 8B:

IRIS POSITION data,

AGC data, (if GAIN is represented using the data, then GAIN=−3+AGC×3[dB])

AE MODE data, (0000, 0001, 0010, 0011 and 0100 are respectively defined as equal to Full Auto, Gain Priority Mode, Shutter Priority Mode, Iris Priority Mode and Manual according to the value of the data)

WHITE BALANCE data, (000, 001, 010 and 011 are respectively defined as equal to W. B. Auto, W. B. Hold, Onepush and W. B. Preset according to the values of the three leftmost bits of the data and 00000, 00001, 00010, 00011, 00100 and 00101 are respectively defined as equal to Candle, Incandescent Lamp, Fluorescent lamp of low color temperature, Fluorescent lamp of high color temperature, Sunlight and Cloudiness according to the values of the five rightmost bits), and FOCUS POSITION data (when the value of MSB of the data is "0", the data shows Auto Focus and when its value is "1", the data represents Manual Focus. When bit-0 and bit-1 data of the data are set as FP[1–0] and bit-2 through bit-6 data thereof are set as FP[6–2], the focus is given by an equation $$FP[6-2] \times 10^{FP[1-0]}(cm)).$$

The following data are recorded in a CONSUMER CAMERA-2 pack shown in FIG. 8C:

V PANNING data (when the value of MSB of the data is "0", the data shows PANNING in a vertical scanning direction and when its value is "1", the data shows PANNING in a reverse direction. Further, the five rightmost bits of the data represent a PANNING speed or velocity (line/field) in the vertical direction in binary number. However, when the value of the above 5 bits is 1 Eh (represented in the form of the hexadecimal number), the PANNING speed represents a velocity greater than 29 lines/field), H PANNING data (when the value of MSB of the data is "0", the data shows PANNING in a horizontal scanning direction and when its value is "1", it shows PANNING in a reverse direction. Further, the six rightmost bits of the data represent ½ of a PANNING speed or velocity [pixel/field] in the horizontal direction in the form of the binary number. In this case, however, 1 pixel shows 1/13.5 MHz. When the value of the above 6 bits is 3 Eh, the PANNING speed shows a velocity greater than 122 pixels/field), Flag IS (when the value of the flag IS is "0", an Image Stabilizer is ON and when its value is "1", the Image Stabilizer is OFF), FOCAL LENGTH data (when bit-7 through bit-1 data of the data are assumed to be FL [7–1] and bit-0 data is assumed to be FL [0], FOCAL LENGTH is given as FL [7–1]×10$^{FL[0]}$ (mm), Flag ZEN (when the value of the flag ZEN is "0", E-ZOOM is defined as ON and when its value is "1", E-ZOOM is defined as OFF), and E-ZOOM data (which represents the value of Electric Zoom. The two leftmost bits show Integral Part and the five rightmost bits represent Decimal Part. However, when the value of the data is 7 Eh, the data represents that the zoom ratio is greater than 4).

The following data are recorded in a LENS pack shown in FIG. 8D:

FOCUS POSITION data and IRIS POSITION data defined in a manner similar to the CONSUMER CAMERA-1 pack when the IRIS POSITION data is represented as IP, the value of IRIS POSITION is given by the following equation:

$$(\sqrt{2})^{IP/16}$$

ZOOM POSITION data (when data of bits 7 through 1, of the data are respectively regarded as ZP [7 1] and data of bit 0 is taken as ZP [0], ZOOM POSITION is given by the following equation:

$$ZP[7-1] \times 10^{ZP[0]}(mm)$$

IRIS CONT data (00, 01 and 10 are respectively defined as equal to AUTO IRIS MODE, ONE PUSH AUTO MODE and MANUAL MODE according to the value of the data), and EXTENDER data (one-fourth the value of the data represents Ratio of EXTENDER).

The following data are recorded in a GAIN pack shown in FIG. 8E:

MASTER GAIN data (when MSB is "0", the data represents AGC ON, whereas when MSB is "1", the data shows AGC OFF), R GAIN data, B GAIN data, CC FILTER data (Color Change Filter is defined according to the value of a code for the data as follows:
1000=3200K→3200K
1001=4300K→3200K
1010=5600K→3200K
1100=6300K→3200K), and ND FILTER data (when the value of the data is represented as NF, Ratio is as follows:
Ratio=½$^{NF}$).

G, R, B PEDESTAL data (these data represent offset values of PEDESTALS. When these data are respectively 80 h, offset corresponds to 0% (i.e., preset value) and Δ1LSB corresponds to 0.25%. However, when the value of a flag QF of a PC4 in the PEDESTAL pack shown in FIG. 9A is "0", Δ1LSB corresponds to 0.0625%), and the flag QF (when the flag is "0", BP, RP and GP in the PC4 are respectively added to the PEDESTAL data of PC1 through PC3 as the two rightmost bits), are recorded in a PEDESTAL pack shown in FIG. 9A.

G, R and B GAMMA data (when the data are respectively 00 h, 80 h and FEh, the values of GAMMAs represent 0.30, 0.45 (preset value) and 0.60 according to the values of these data. Δ1LSB of each data corresponds to 0.15/128. However, when the value of a flag QF of a PC4 in the pack is "0", Δ1LSB corresponds to 0.15/512), and the flag QF (when the flag is "0", BG, RG and GG in the PC4 are respectively added to the GAMMA data of PC1 through PC3 as the two rightmost bits) are recorded in a GAMMA pack shown in FIG. 9B.

The following data are recorded in a DETAIL pack shown in FIG. 9C:

respective data having MASTER DETAIL LEVEL, H (Horizontal) DETAIL LEVEL and V (Vertical) DETAIL LEVEL (when these data are respectively 00 h, 80 h and FEh, the levels of DETAILS represent 0%, a preset value and 200% according to the values of these data. Δ1LSB of each data corresponds to (preset value)/128. However, when the value of a flag QF of a PC4 in the DETAIL pack is "0", Δ1LSB corresponds to (preset value)/512), and the flag QF (when the flag is "0", DL, HD and VD in the PC4 are respectively added to the DETAIL data of PC1 through PC3 as the two rightmost bits).

A CAMERA TEXT HEADER pack and a CAMERA TEXT pack shown in FIGS. 9D and 9E are used for recording text data regarding a camera therein. Data recorded in the CAMERA TEXT HEADER pack subsequently to the CAMERA TEXT HEADER pack are as follows:

Total number of TEXT data (TDP),

TEXT TYPE data (which represents the attribute of the text data. According to the values of the data, 0, 1, 2, 3, 4, 5, 6, 8, C, D and E are respectively defined as equal to Name, Memo, Station, Model, Lens, Filter, Operator, Outline, 1-Byte coded Font, 2-Byte coded Font and Graphic), TEXT CODE data (text codes (JIS, shift JIS, etc.) for text data), and OPN indicative of an optional code related to each TEXT code.

Since the text data recorded subsequently to the TEXT HEADER pack are stored and recorded in a TEXT pack to be specifically described below, the number of the TEXT packs is stored as the value of the TDP.

However, when it is desired to store the text data in an MIC, text codes are successively stored and recorded from the position of a PC4 in the TEXT HEADER pack without using the TEXT pack so that a single pack is formed between the position of a PC0 in the TEXT HEADER pack and a byte position where the final text data is recorded, in order to save the amount of a storage area of the MIC having a small storage capacity.

Namely, in this case, the storage area of the MIC can be saved by the number of bytes for an ITEM code in a TEXT pack by adopting a configuration shaped in the form of a variable-length pack in which TEXT data corresponding to objects to be recorded are all stored in the single pack as compared with the case where the TEXT pack is used.

In this case, the number of text codes (i.e., the number of bytes) is stored as the value of TDP. It is thus possible to easily judge or determine the position of an ITEM code in a pack subsequent to the TEXT data in the variable-length pack.

TEXT data are recorded by 4 bytes in the CAMERA TEXT pack shown in FIG. 9E.

The following data are recorded in a CAMERA PRESET pack shown in FIG. 10A:

SHUTTER SPEED (1) data (if the value of the data is assumed to be SSP1, then the shutter speed is given as follows:

$\frac{1}{2}SSP1$

SHUTTER SPEED (2) data (which shows a shutter speed at a lower line in the case of an image sensing operation for simultaneously reading both an upper line and the lower line in an image sensing device. If the value of the data is assumed to be SSP2, then the shutter speed is represented as follows:

$\frac{1}{2}SSP2$

Incidentally, the shutter speed at the upper line in this case is represented by the SHUTTER SPEED (1) data), and CONSUMER SHUTTER SPEED data (if the value of the data is assumed to be CSS, then the shutter speed is given by 1/(TH×CSS) where TH represents one horizontal scanning period).

Incidentally, the SHUTTER SPEED (1) and the SHUTTER SPEED (2) data are respectively shutter speed data used for a commercial TV camera.

G, R and B FLARE data (when values of these data are respectively 80 h, each FLARE correction value represents 0% and Δ1LSB of these data respectively correspond to 0.5%. However, when the value of a flag QF of a PC4 in a FLARE pack shown in FIG. 10B is "0", Δ1LSB corresponds to 0.125%) equivalent to flare correction data for G, R and B channels, and the flag QF (when the flag is "0", BF, RF and GF in the PC4 are respectively added to the FLARE data of PC1 through PC3 as the two rightmost bits) are recorded in the FLARE pack shown in FIG. 10B.

Figures 11, 12A, 12B:
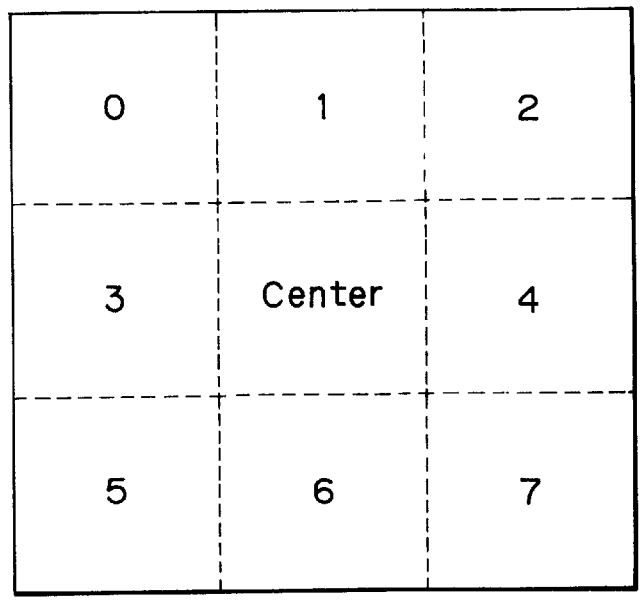
FIG. 11 is a view illustrating an area division at the time of shading correction.
FIGS. 12A and 12B are respectively views showing structures of a KNEE pack and a SHUTTER pack.

SHAD COMP(1) through SHAD COMP(7) indicative of respective shading correction values at areas of 0 to 7 shown in FIG. 11 are recorded in SHADING-1 and SHADING-2 packs shown in FIGS. 10C and 10D. Each of the data represents a correction value at 0 dB gain. When each of the values of these data is 40 h, the correction value shows 0% and Δ1LSB of each data corresponds to 0.5%. However, when the value of a flag QF2 for a PC4 is "0", Δ1LSB corresponds to 1%. Further, QF1 and QF0 respectively represent codes indicative of channels. When the code is "00", the channel represents a R channel, when the code is "01", the channel shows a G channel and when the code "10", the channel represents a B channel.

KNEE POINT data (when the data is 80 h, a KNEE POINT value represents 100% and Δ1LSB of the data corresponds to 0.25%) and KNEE SLOPE data (which is defined according to the value of the data as follows:

00 h=(500%→0%)
80 h=(500%→15%) (Preset)
FEh=(500%→30%))

are recorded in a KNEE pack shown in FIG. 12A.

Data similar to the aforementioned CAMERA PRESET pack are recorded in a SHUTTER pack shown in FIG. 12B. In this case, however, a TEXT flag is not recorded in the SHUTTER pack.

2) Structure of recording area in MIC

A description will now be made of the structure of the MIC in which the aforementioned various packs shown by way of illustrative example are recorded.

Figure 13:
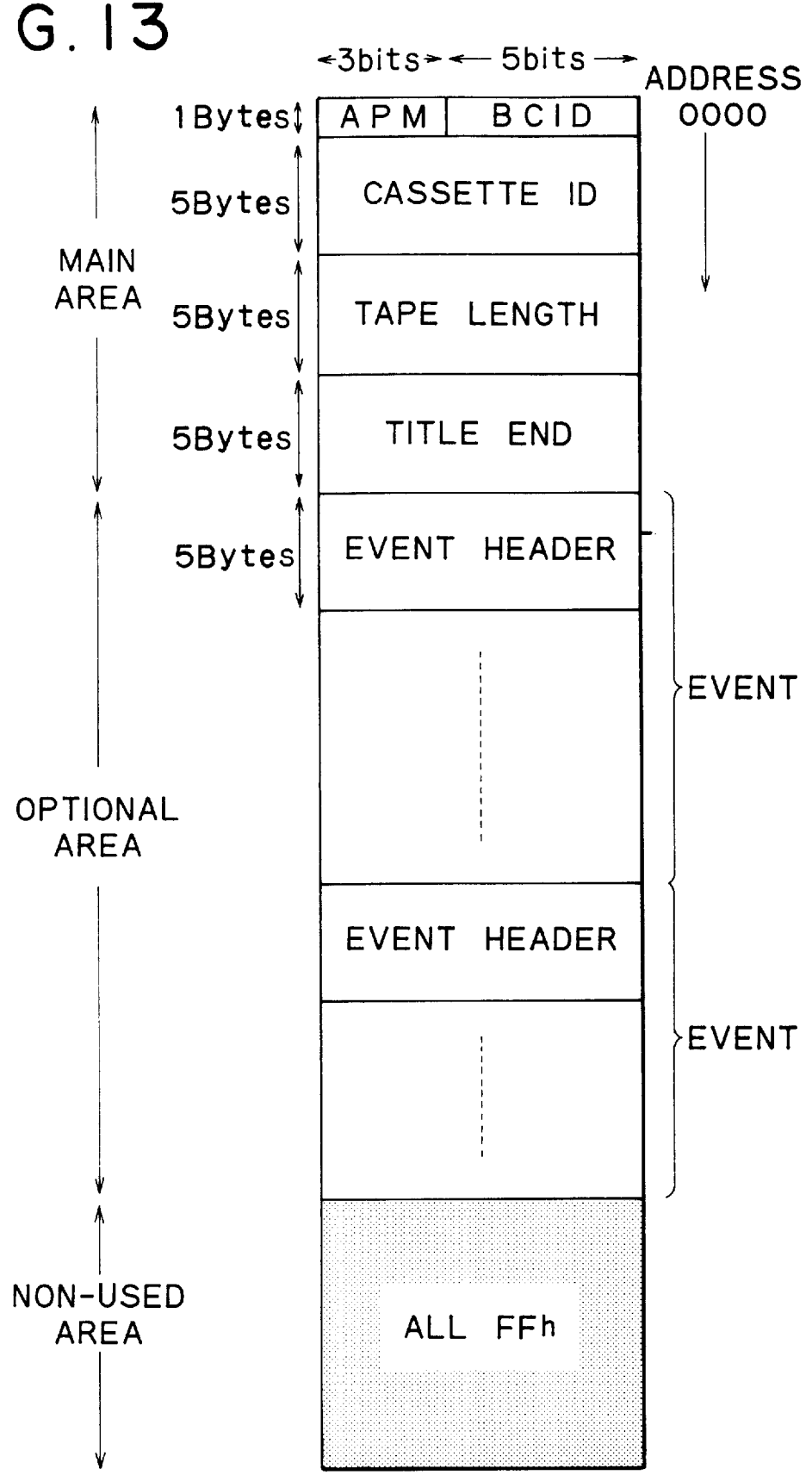
FIG. 13 is a view for explaining the structure of data recording areas of an MIC.

FIG. 13 illustrates the structure of data in the recording area of the MIC.

As shown in FIG. 13, all the data recording is effected under pack structures exclusive of 1 byte corresponding to the head and a non-used area (in which FFh is recorded). As described above, only the text data takes a variable-length pack structure and the data other than the text data takes a 5-byte fixed-length pack structure.

APM 3 bits and BCID (Basic Cassette ID) 4 bits, which are ID data specifying the data structure of the MIC, are recorded at the leading address 0 in the recording area of the MIC.

Now, the BCID is a basic cassette ID, which corresponds to the same contents as those of an ID board for ID recognition (thickness, type and grade of a tape) used for a cassette with no MIC mounted therein.

The ID board allows an MIC read terminal to perform the same role as a recognition hole of a conventional 8-mm VTR. It is thus unnecessary to define holes in a cassette half as in the conventional example.

Three packs, i.e., the aforementioned CASSETTE ID pack, the TAPE LENGTH pack, the TITLE END pack are successively recorded at addresses subsequent to an address 1. Now, a recording area between the leading address 0 and the TITLE END pack is called a "main area". Even in the case of MICs of any cassettes, data about the determined contents of these are recorded in this area.

Further, a recording area subsequent to the main area is referred to as an "optional area", which is comprised of a desired number of events. Namely, the main area shows a fixed area of 16 bytes corresponding to the addresses 0 through 15, whereas the optional area is a variable area at addresses subsequent to the address 16.

Now, each event normally means a single data group comprised of a plurality of packs and each pack located in its head is called an "event header."

As the packs called the event headers, specific packs are determined in advance according to the contents of the respective events.

Of the packs described in FIGS. 7 through 12, for example, the PROGRAM START pack, the PROGRAM TEXT HEADER pack and the CAMERA PRESET pack are respectively defined as an event header of a program event, an event header of a text event about a program (however, when the text event is recorded in the MIC, the text event is constructed of a single variable-length pack alone) and an event header of a camera event.

In this case, a pack defined as an event header of other events is prohibited from entering a single event. Namely, a single event is constructed during a period from a single event header to the next event header.

Specific examples of the events recorded in the optional area will now be described with reference to typical views shown in FIGS. 14 and 1.

Figure 14:
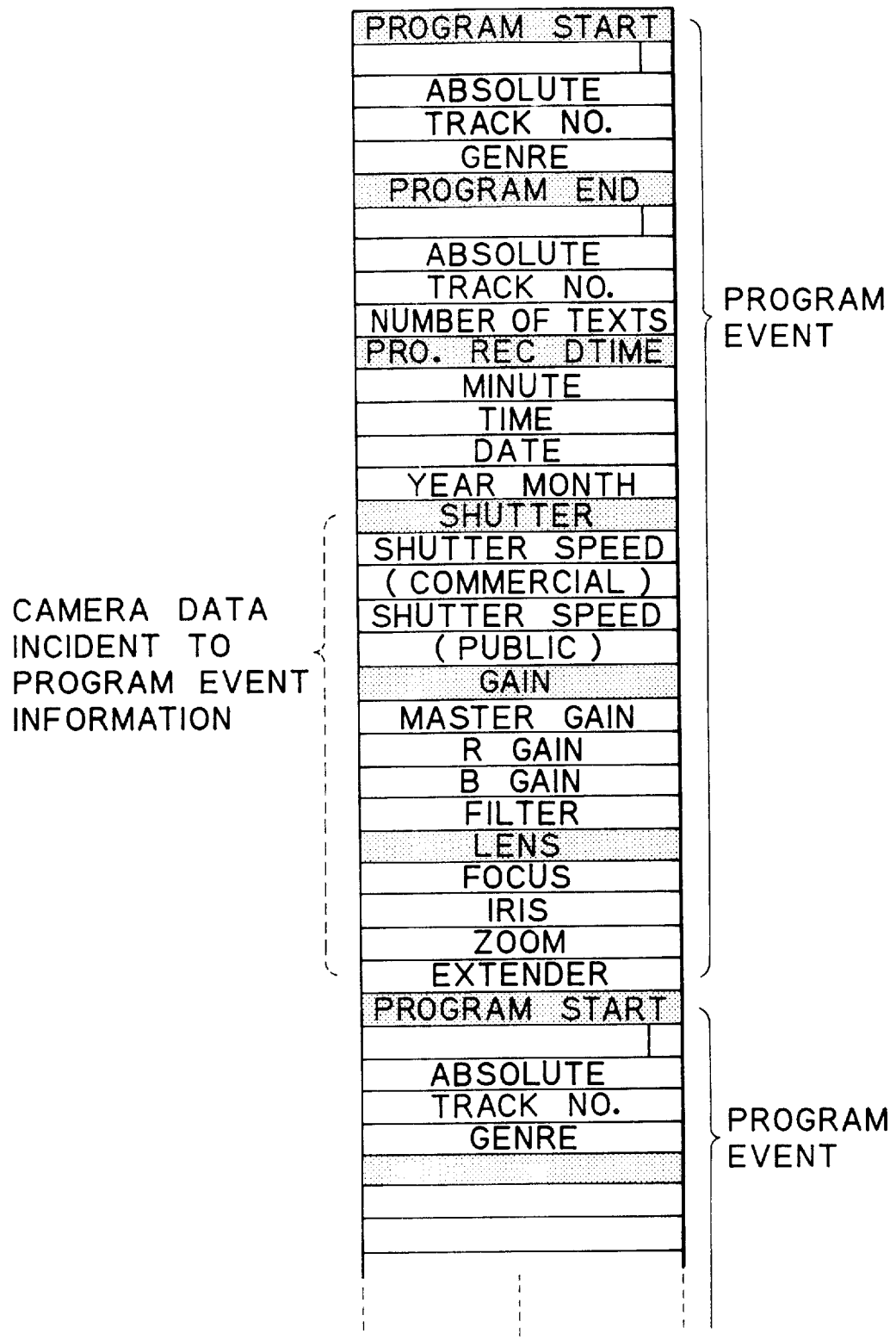
FIG. 14 is a view showing other example of data recorded in an optional area of an MIC.

Two program events are shown in FIG. 14. However, a first program event is particularly comprised of a PROGRAM START pack, a PROGRAM END pack, a PROGRAM REC DTIME pack, a SHUTTER pack, a GAIN pack and a LENS pack.

When a user issues a command to the mode processing microcomputer 12 to display data about these packs, the user can recognize the date of recording of a desired program recorded on a tape and image-sensing conditions such as states of a shutter speed, gain and a lens of a camera upon recording.

As a pack for recording data about the shutter speed, the aforementioned CAMERA PRESET pack also exists. Since, however, the present pack is defined as the event header of the camera event as described above, the pack cannot be inserted into this program event. In order to record the data about the shutter speed, a SHUTTER pack must be used as shown in FIG. 14.

Figure 1:
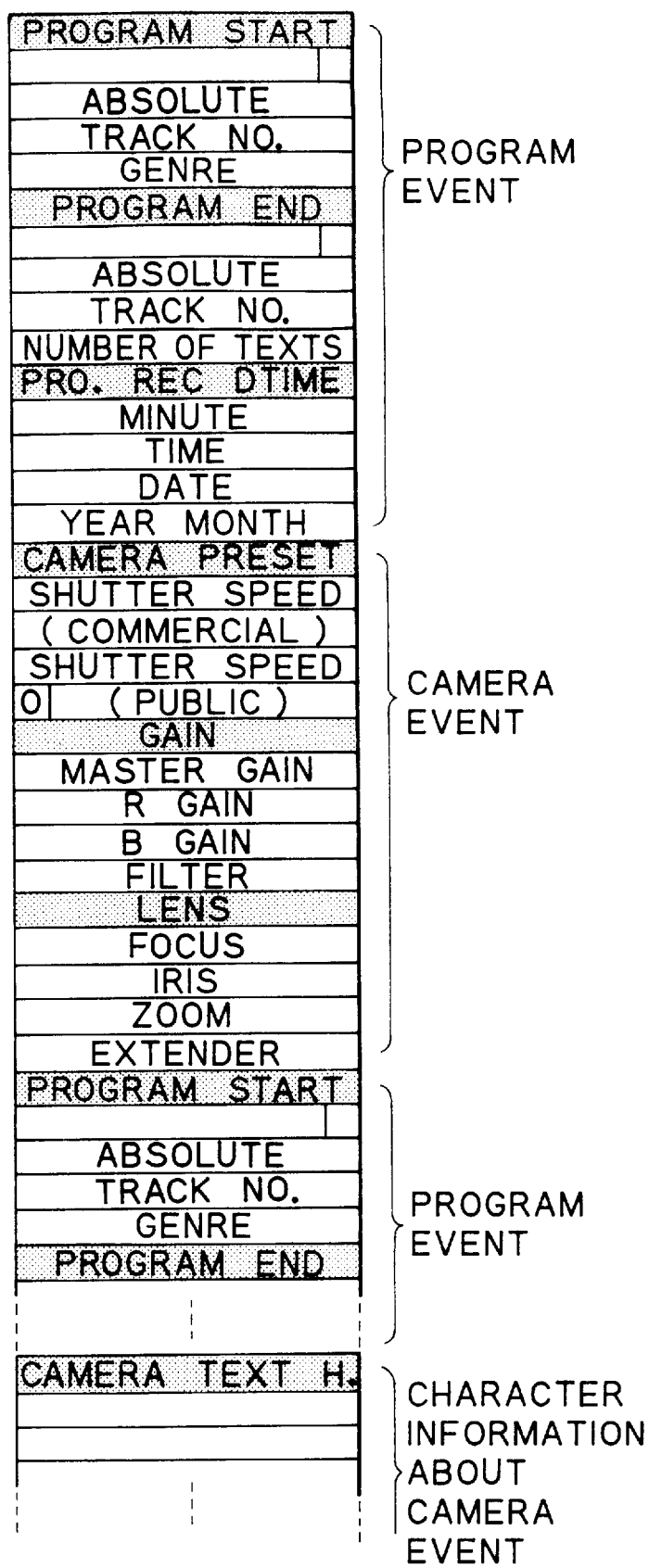
FIG. 1 is a view showing one example of data recorded in an optional area of an MIC.

FIG. 1 shows two PROGRAM events, a single CAMERA event and a TEXT event. Now, the CAMERA event is normally defined as an event for recording data used for control (setting and adjustment) of a camera. The CAMERA event has a purpose different from a purpose for simply recording image-sensing conditions as in the case of the camera data recorded in the PROGRAM event shown in FIG. 14.

Thus, the MIC microcomputer allows the mode processing microcomputer to decode the data about the CAMERA event, thereby making it possible to set the camera based on the result of decoding.

Figure 2:
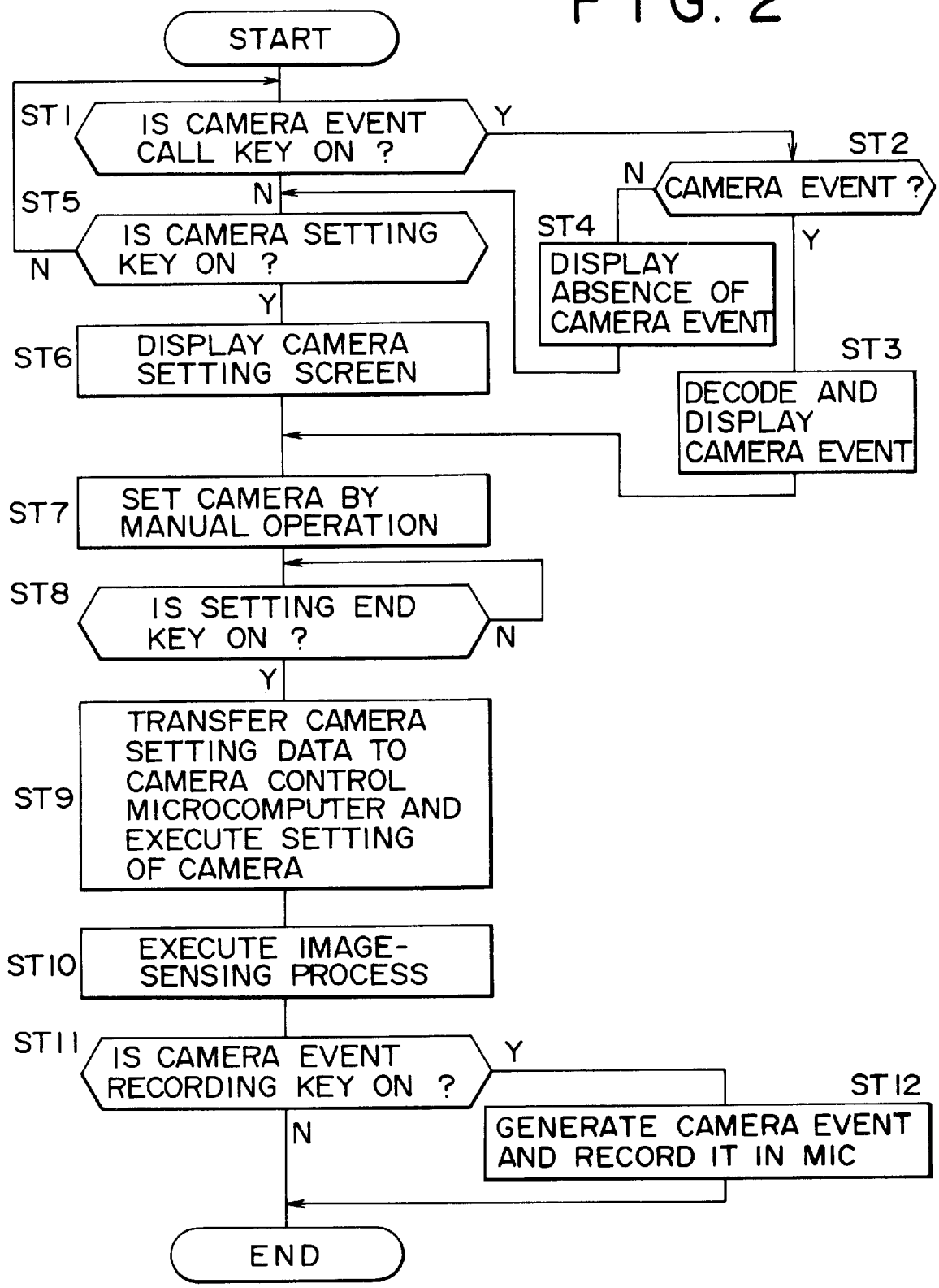
FIG. 2 is a view illustrating one example of a camera setting flow employed in one embodiment of the present invention.

A flow for setting and adjusting the TV camera of the TV camera incorporated VCR shown in FIG. 3 will be described below with reference to FIG. 2 for reference purposes.

When a user turns ON a camera event call key or a camera setting key, the TV camera incorporated VCR is so constructed that a camera setting (adjustment) screen can be called up to a display device. The mode processing microcomputer 12 normally checks whether either one of these two keys is in an ON state (Steps ST1 and ST5).

If the answer is YES in ST1, then the mode processing microcomputer 12 checks whether a CAMERA event exists in the MIC through the MIC microcomputer 13 (Step ST2).

If the answer is YES in ST2, then the mode processing microcomputer 12 displays various camera setting data obtained by decoding the CAMERA event to notify them to the user (Step ST3).

If it is determined in Step ST2 that the CAMERA event has not been found out even if an MIC recording area is searched, then the mode processing microcomputer 12 displays the absence of a corresponding event in the MIC to notify it to the user (Step ST4). Next, the mode processing microcomputer 12 checks whether the camera setting key has been turned ON by the user (Step ST5).

If the answer is NO in Step ST1 and the camera setting key is turned ON in Step ST5 while a loop comprised of Steps ST1 and ST5 is being repeated, then the mode processing microcomputer 12 proceeds to Step ST6 where a camera setting (adjusting) screen is displayed for the user.

Next, the user performs a desired camera setting while seeing the contents of the setting displayed in Step ST3 referred to above or the set screen displayed in Step ST6 (Step ST7).

When the contents of the CAMERA event in the MIC are used as the camera setting data as they are, the mode processing microcomputer 12 immediately proceeds to the next Step ST8 without performing a manual adjustment in Step ST7 and turns ON a setting end key.

When the setting end key is turned ON, the camera setting data is transferred to the camera control microcomputer 4 provided on the TV camera side so that the camera is brought into a desired set state based on the camera setting data (Step ST9).

After an image sensing process is thereafter performed and an intended recording has been completed, the user turns ON a CAMERA event recording key. Thus, the user can record the present image sensing and setting condition in the MIC as a CAMERA event so as to be able to use it again upon image sensing (Steps ST11 and ST12).

Incidentally, the generation and recording of the CAMERA event are performed in the following manner. Described specifically, the mode processing microcomputer 12 reads the camera setting data supplied to the camera control microcomputer 4 and supplies the read data to the MIC microcomputer 13 as CAMERA event generating data. The MIC microcomputer 13 generates packs necessary to form the CAMERA event based on the supplied data and records the generated respective packs in the MIC.

Although omitted from the flow referred to above, the recording of an image sensing and setting condition by the operation of the CAMERA event recording key is constructed so as to be able to be performed at anytime after the setting end key has been turned ON in Step ST8.

According to the flow referred to above, the CAMERA event recorded in the MIC is called only when the CAMERA event call key is turned ON by the user. Further, the camera can be set up based on the contents of each event. However, the flow of the mode processing microcomputer may be further simplified as follows. Namely, when the cassette is loaded into the VCR, the CAMERA event in the MIC is automatically searched. When the CAMERA event is found from the result of search, the camera is automatically set in accordance with the contents of the event.

A description has been made of the embodiment in which the invention of the present application is applied to the TV camera incorporated VCR. It is however needless to say that the present invention can be immediately applied to an image sensing and recording system other than such VCR, in which a Television camera and a VCR are constructed so as to be separated from each other. In the case of such a separation type system, various commands and data input from a user are directly input to a camera control microcomputer. For example, the separation type system is constructed in such a manner that the user can call up camera setting data recorded in an MIC and set a camera while operating a television camera on hand, or a set state of a Television camera when being image-sensed at present can be recorded in the MIC as a CAMERA event.

In addition to the above embodiment, various changes in configuration can be made to the present invention. For example, a disk may be used as a recording medium as an alternative to the tape. As a memory device installed in a cassette of a recording medium, a magnetic sheet or the like attached to the cassette may be used instead of the aforementioned IC memory. As a specific example of application, the present invention can be immediately applied to an electronic still video camera, a medical image device or the like, for example, as well as applied to the combination of the television camera and the VCR, which has been described above.

What is claimed is:

1. An image recording apparatus comprising:

image sensing means having a camera with a plurality of setable parameters pertaining to the operation of said camera for providing an image signal;

means for receiving a cassette removably installed in the apparatus and containing a recording medium and a memory device apart from said recording medium;

means for setting said parameters of said camera of said image sensing means;

means for generating information indicative of the set parameters of said camera;

recording and reproducing means for recording said image signal from said image sensing means on and from, respectively, said recording medium in the installed cassette;

means apart from said recording and reproducing means for writing in said memory device of the installed cassette said information indicative of the set parameters of said camera when the image signal was recorded on said recording medium;

reading means also apart from said recording and reproducing means for reading said information indicative of the set parameters of said camera from said memory device in said cassette when the latter is again installed in the apparatus; and means for generating data from the information read from said memory device in said cassette by said reading means and for supplying the data to the setting means so as to automatically set said parameters of said camera in accordance with said data when said cassette is again installed in the apparatus.

2. The image recording apparatus as claimed in claim 1, wherein said information indicative of the set parameters of said camera is included in incident data which is constructed with an event comprised of a header pack and a pack subsequent to the header pack as a unit, and said reading means identifies an event with said information recorded therein, based on data of the header pack in said event.

3. The image recording apparatus as claimed in claim 2, wherein each of the header pack and the pack subsequent to the header pack has a data structure having a fixed length.

4. The image recording apparatus as claimed in claim 3, wherein said image sensing means includes an optical system for focusing light from a subject, an image sensing element for receiving the focused light from said optical system and converting said light to an electrical signal, and a signal processing circuit for wave-shaping said electrical signal outputted from said image sensing element, and wherein the setting means controls said optical system, said image sensing element and said signal processing circuit in response to said data from the means for generating data and for supplying the data.

5. The image recording apparatus as claimed in claim 4, wherein said optical system includes a lens and an iris and said setting means controls the iris in response to said data from the means for generating data and for supplying the data.

6. The image recording system as claimed in claim 5, wherein said setting means includes a focus control circuit and a zoom control circuit and controls said focus control circuit and said zoom control circuit in response to said data from said means for generating data and for supplying the data.

7. The image recording apparatus as claimed in claim 6, wherein said setting means further includes a shutter control circuit, a white balance control circuit and a gamma correction circuit and controls said shutter control circuit, said white balance control circuit and said gamma correction circuit in response to said data from said means for generating data and for supplying the data.

8. The image recording apparatus as claimed in claim 7, wherein said memory device installed in the cassette is an IC chip.

* * * * *